(12) United States Patent
Choi et al.

(10) Patent No.: US 9,054,600 B2
(45) Date of Patent: Jun. 9, 2015

(54) CONTROL APPARATUS FOR REGENERATIVE MEDIUM VOLTAGE INVERTER

(71) Applicant: LSIS CO., LTD., Anyang-si, Gyeonggi-do (KR)

(72) Inventors: Seungcheol Choi, Anyang-si (KR); Anno Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 220 days.

(21) Appl. No.: 13/711,526

(22) Filed: Dec. 11, 2012

(65) Prior Publication Data
US 2013/0170256 A1 Jul. 4, 2013

(30) Foreign Application Priority Data
Dec. 30, 2011 (KR) .......................... 10-2011-0147290

(51) Int. Cl.
*H02M 7/48* (2006.01)
*H02M 5/458* (2006.01)

(52) U.S. Cl.
CPC .............. *H02M 7/48* (2013.01); *H02M 5/4585* (2013.01)

(58) Field of Classification Search
CPC .................................................. H02M 5/4585
USPC ..................................... 363/36, 45, 34–35, 37
See application file for complete search history.

(56) References Cited

U.S. PATENT DOCUMENTS

| 5,184,057 | A | 2/1993 | Sakai et al. | |
| 6,154,379 | A | 11/2000 | Okita | |
| 6,567,283 | B2 * | 5/2003 | Welches | 363/89 |
| 7,164,590 | B2 * | 1/2007 | Li et al. | 363/40 |

FOREIGN PATENT DOCUMENTS

| CN | 1381944 | 11/2002 |
| CN | 201328084 | 10/2009 |
| CN | 102130625 | 7/2011 |
| CN | 102255603 | 11/2011 |
| CN | 202076803 | 12/2011 |
| JP | 2009-207300 | 9/2009 |

OTHER PUBLICATIONS

Japan Patent Office Application Serial No. 2012-279244, Office Action dated Jan. 14, 2014, 2 pages.
The State Intellectual Property Office of the People's Republic of China Application Serial No. 201210592108.5, Office Action dated Oct. 10, 2014, 7 pages.

* cited by examiner

*Primary Examiner* — Harry Behm
(74) *Attorney, Agent, or Firm* — Lee, Hong, Degerman, kang & Waimey (57) ABSTRACT

A control apparatus for regenerative medium voltage inverter is disclosed. The control apparatus controls a switching of a PWM converter unit by generating a voltage compensating a power difference between an input and an output of the PWM converter unit.

7 Claims, 7 Drawing Sheets

CONTROL APPARATUS FOR REGENERATIVE MEDIUM VOLTAGE INVERTER

CROSS-REFERENCE TO RELATED APPLICATIONS

Pursuant to 35 U.S.C. §119 (a), this application claims the benefit of earlier filing date and right of priority to Korean Patent Application No. 10-2011-0147290, filed on Dec. 30, 2011, the contents of which are hereby incorporated by reference herein in their entirety.

FIELD OF THE DISCLOSURE

The present disclosure relates to a control apparatus for regenerative medium voltage inverter.

DISCUSSION OF THE RELATED ART

This section provides background information related to the present disclosure which is not necessarily prior art.

In general, a medium voltage inverter is an inverter having an input power whose RMS (root mean square) value is over 600V for a line-to-line voltage, and is generally used to drive an industrial load of large inertia of, for a non-limiting example, fans, pumps and compressors.

In these application fields, variable speed operations frequently occur, where regenerative operations are generated, if a fast acceleration or a fast deceleration is required.

Figure 1:
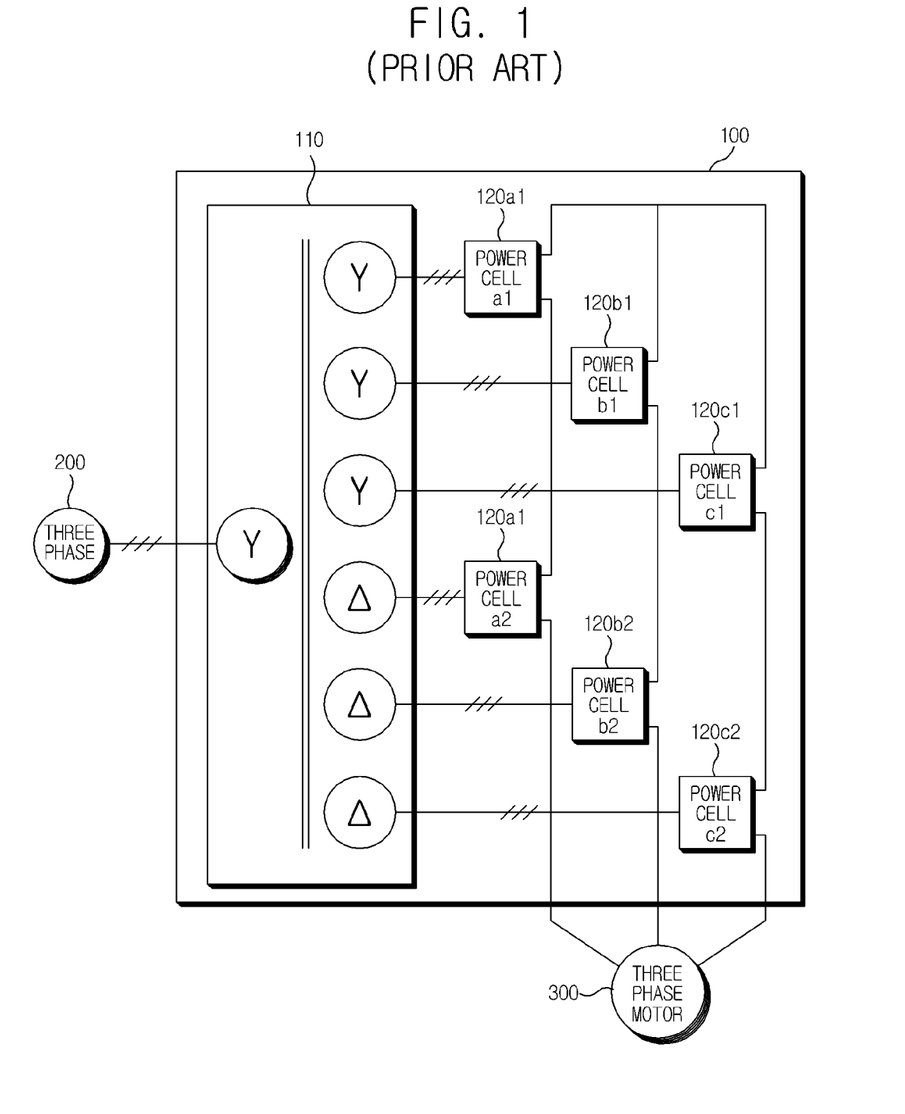
FIG. 1 is a structural view illustrating a series H-bridge medium voltage inverter according to prior art.
Figure 2:
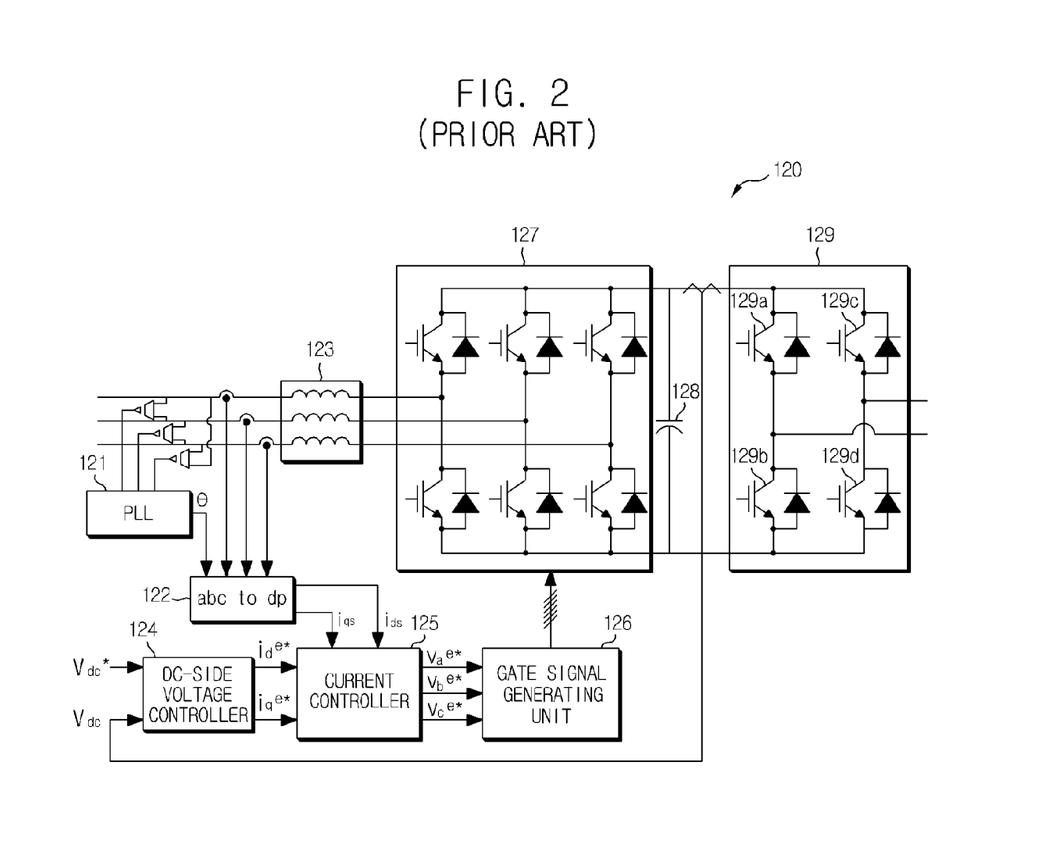
FIG. 2 is a structural view illustrating a unit power cell of FIG. 1.

FIG. 1 is a structural view of a series H-bridge medium voltage inverter system according to prior art, where the inverter system is configured with a two-stage unit power cells (120). FIG. 2 is a structural view illustrating a unit power cell of FIG. 1.

A phase switching transformer (110) converts a phase and a magnitude of a high voltage input power received from an input power unit (200) whose rms (root mean square) value is over 600V for a line-to-line voltage in response to requirement of the unit power cell (120).

An output of the phase switching transformer (110) becomes an input power of each unit power cell (120), and the unit power cell (120) combines input voltages and supplies a power to a three-phase motor (300).

An 'a' phase voltage of a medium voltage inverter (100), a 'b' phase voltage of the inverter (100), and a 'c' phase voltage of the inverter (100) are a sum of output voltages of the unit power cell (120) relative to each phase.

A PLL (Phase Locked Loop, 121) of FIG. 2 provides phase angle information of a required power, in case a three-phase stationary reference frame is converted to a two-phase stationary reference frame. The angle information estimated by the PLL (121) is used for control of an entire system.

A DC (Direct Current) terminal capacitor (128) serves to solve a power imbalance at input/output terminals, where, in a case an input power supplied from a power side is greater than an output power consumed by a load, a DC terminal voltage increases, and in a reverse case, the DC terminal voltage decreases. A voltage of the DC terminal capacitor (128) is controlled by a DC terminal voltage controller (124), and an output of the DC terminal voltage controller (124) becomes a q-axis current command of a current controller (125).

Figure 3A:
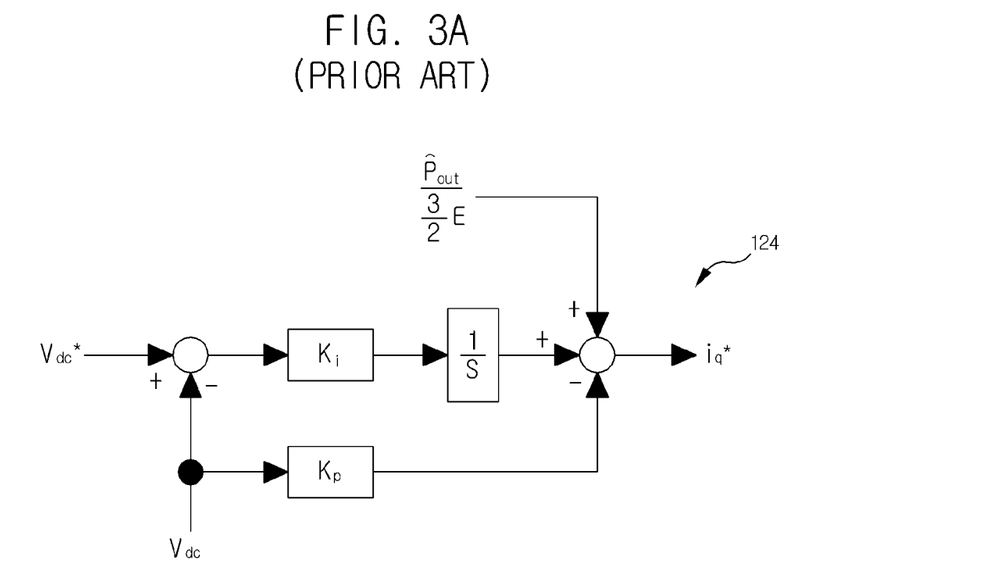
FIGS. 3a and 3b are respectively detailed configurative views of a DC-link voltage controller of FIG. 2.
Figure 3B:
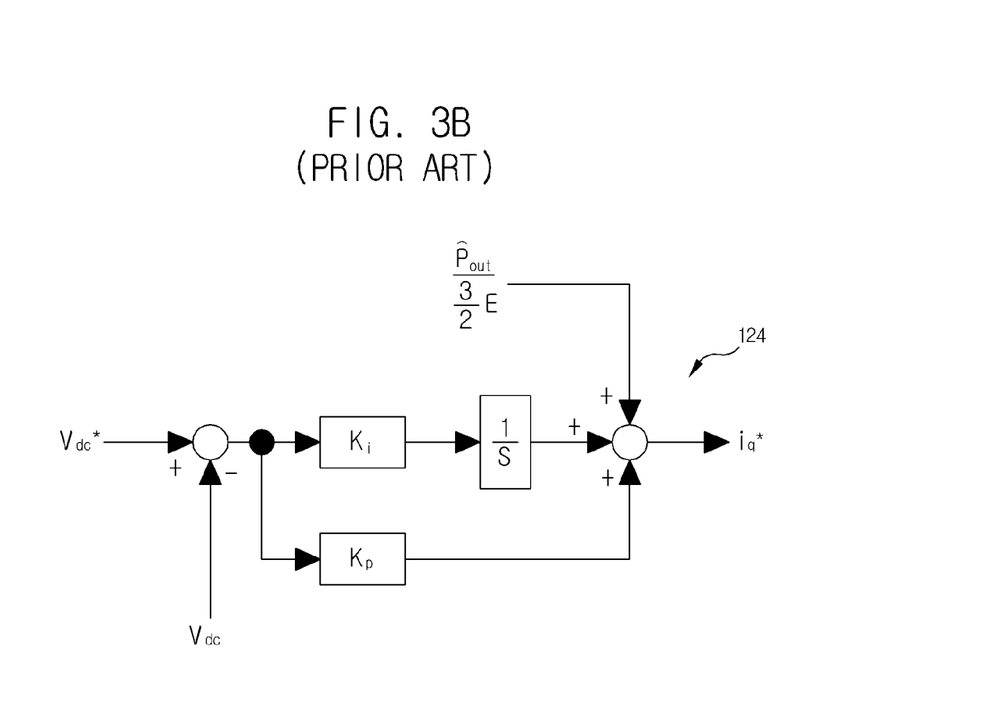

FIGS. 3a and 3b are respectively detailed structural views of the DC terminal voltage controller (124), which may include an IP (Integral and Proportional) controller (FIG. 3a) or a PI (Proportional Integral) controller (FIG. 3b), both of which may be selectively used according to applied fields. Outputs of FIG. 3a and FIG. 3b may be expressed by the following Equations 1 and 2.

$$i_q^{e*} = -K_p v_{dc} + K_i \int (v_{dc}^* - v_{dc}) dt + \frac{\beta_{out}}{\frac{3}{2}E} \quad \text{[Equation 1]}$$

$$i_q^{e*} = K_p (v_{dc}^* - v_{dc}) + K_i \int (v_{dc}^* - v_{dc}) dt + \frac{\beta_{out}}{\frac{3}{2}E} \quad \text{[Equation 2]}$$

The current controller (125) controls d-axis and q-axis current of a synchronous reference frame, where a q-axis current component is defined as an active power current while a d-axis current component is defined as an inactive power current.

If necessary, the current controller (125) may also control a power factor of an AC power source side. In a case the power source voltage and current are sinusoidal waves, the power factor may be expressed by the following Equation 3.

$$PF = \frac{e_{dq}^e \cdot i_{dq}^e}{|e_{dq}^e||i_{dq}^e|} = \frac{i_q^e}{\sqrt{i_d^2 + i_q^2}} \quad \text{[Equation 3]}$$

where, $e_{dq}^e = e_d^e + j e_q^e$, $i_{dq}^e = i_d^e + j i_q^e$, $e_{dq}^e \cdot i_{dq}^e$ means an inner product of a voltage complex vector and a current complex vector of a power on a synchronous reference frame, and $|e_{dq}^e||i_{dq}^e|$ means a product of magnitude of each complex vector.

A d-axis current command on the synchronous reference frame for power factor control may be generated by the following Equation 4, using the above Equation 3.

$$i_d^{e*} = i_q^{e*} \frac{\sqrt{1-PF^{*2}}}{PF^*} \quad \text{[Equation 4]}$$

Figure 4:
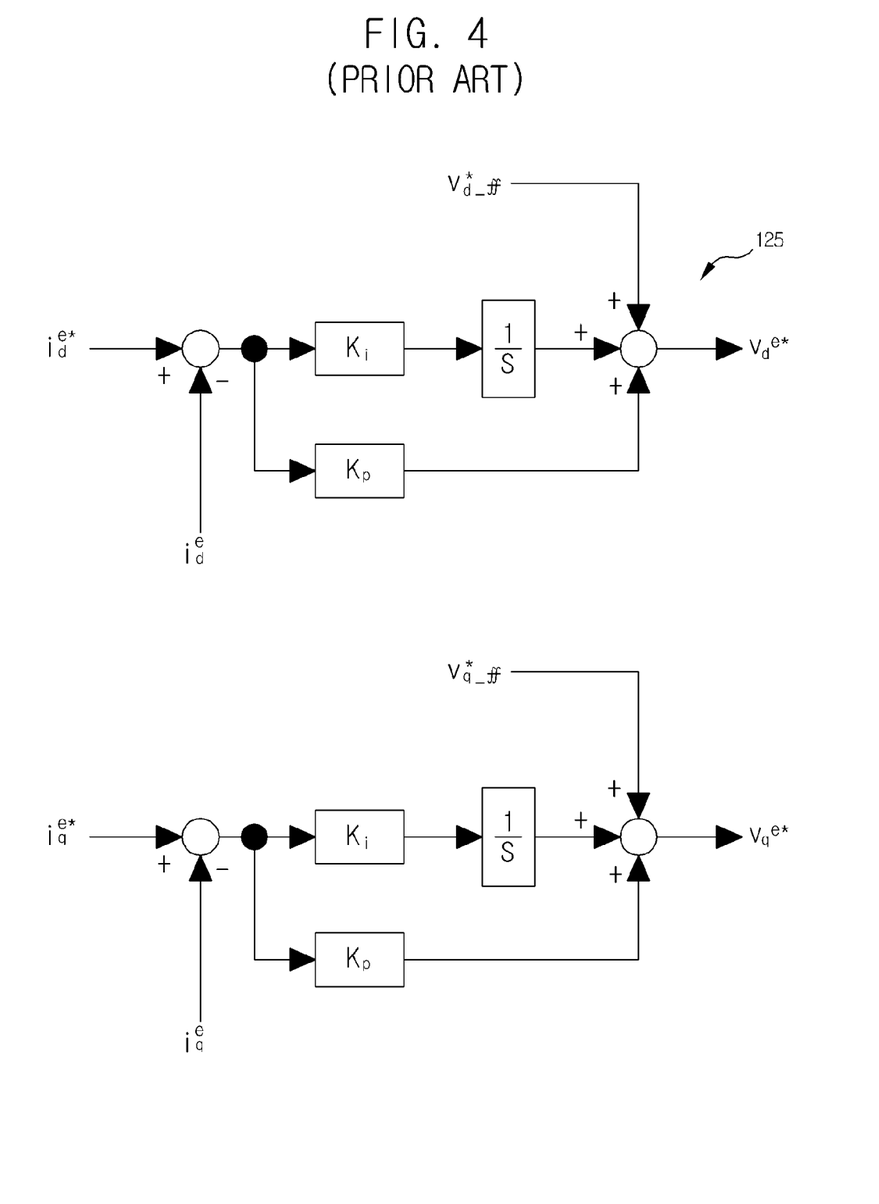
FIG. 4 is a detailed structural view illustrating a current controller of FIG. 2.

FIG. 4 is a detailed configurative view of the current controller of FIG. 2. A coordinate converter (122) serves to convert an actual current measured by a current sensor to a synchronous reference frame. The current controller (125) receives a command current calculated through the DC terminal voltage controller (124) and power factor control and calculates a voltage command using a PI controller and feed forward. Outputs generated by each controller may be expressed by the following Equations.

$$v_q^{e*} = K_p(i_q^{e*} - i_q^e) + K_i \int (i_q^{e*} - i_q^e)dt + v_{q-ff}^{e*} \quad \text{[Equation 5]}$$

$$v_d^{e*} = K_p(i_d^{e*} - i_d^e) + K_i \int (i_d^{e*} - i_d^e)dt + v_{d-ff}^{e*} \quad \text{[Equation 6]}$$

$$v_{q-ff}^{e*} = -\omega_e L_{inter} i_q^e \quad \text{[Equation 7]}$$

$$v_{d-ff}^{e*} = \omega_e L_{inter} i_d^e \quad \text{[Equation 8]}$$

The voltage commands generated by Equations 5 and 6 are converted to stationary reference frame for use as each phase of a PWM (Pulse Width Modulation) converter (127). That is, the voltage commands thus calculated are used by a gate signal generator (126). Conventionally, a space vector PWM method was used in the voltage modulation method.

Figure 5:
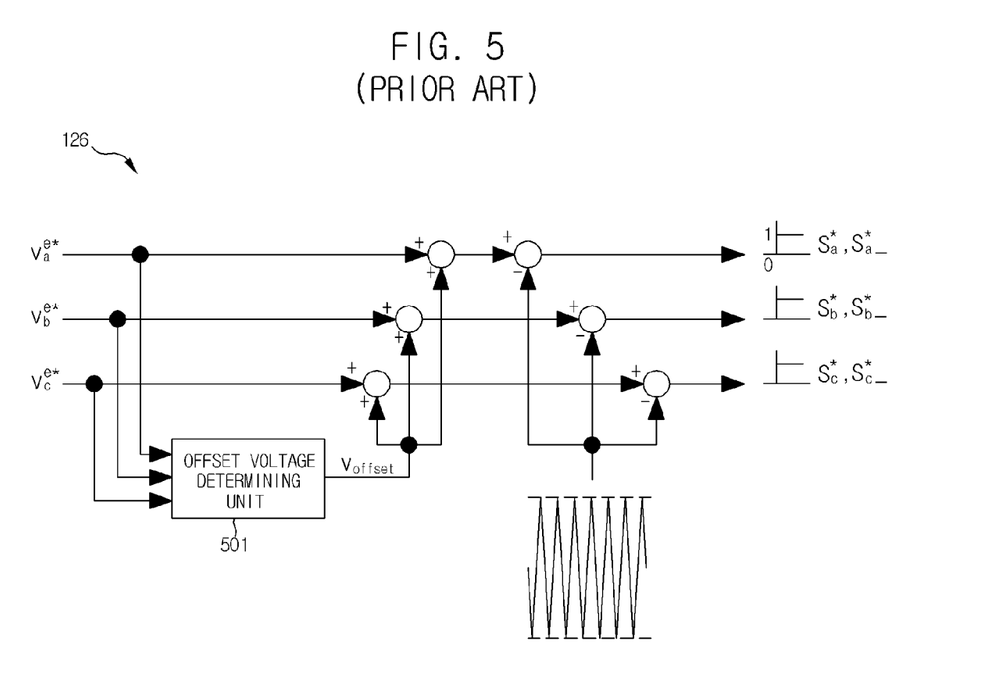
FIG. 5 is a detailed structural view of a gate signal generating unit of FIG. 2.

FIG. 5 is a detailed configurative view of a gate signal generator of FIG. 2, which is realized by a space vector voltage modulation type, where comparison between an offset voltage and a triangular wave is explained.

Referring to FIG. 5, the gate signal generator (126) is such that an offset voltage determinate (501) determines an adequate offset voltage based on a given phase voltage command where the offset voltage is realized by an average concept within a cycle of a voltage modulation. That is, a voltage command determining the switch is changed by how the offset voltage is determined from each phase voltage command. The offset voltage may be determined by the following Equation.

$$v_{offset} = -\frac{v_{max}^* - v_{min}^*}{2} \quad \text{[Equation 9]}$$

where, $v^*_{max}$ and $v^*_{min}$ respectively refer to a maximum and a minimum in the 3-phase voltage command.

As noted above, the gate signal generator (126) generates a gate signal to combine voltages corresponding to voltage commands generated by the current controller (125).

An inverter (123) functions to perform a buffering between a power source supplied from a 3-phase power source (200) and an output power source of the PWM converter (127), whereby a DC-link output voltage of the PWM converter (127) is boosted.

The PWM converter (127) is a 3-phase booster formed with six power devices and capable of performing a bi-directional power flow. That is, the DC-link voltage can be controlled by a power source-side current control.

A DC-link capacitor (128) performs a cushioning function between the PWM converter (127) power and the inverter (129) power. The voltage at the DC-link inverter (129), the inverter (129) being of a single phase full-bridge structure, has the following voltage ripples.

$$v_0 = \sqrt{2} V_0 \sin \omega t \quad \text{[Equation 10]}$$

$$i_0 = \sqrt{2} I_0 \sin(\omega t - \phi) \quad \text{[Equation 11]}$$

where, $\phi$ is a load angle, $\omega$ is an operational frequency, t is a time, and $V_0$ and $I_0$ are RMS values of output voltage and output current. The output powers of unit power cell (120) may be expressed using the Equations 10 and 11.

$$p_0 = v_0 i_0 = V_0 I_0 \cos \phi - V_0 I_0 \cos(2\omega t - \phi) \quad \text{[Equation 12]}$$

It can be learned from the Equation 12 that the output power of unit power cell (120) is divided into a DC component of $V_0 I_0 \cos \phi$ and an AC component of $V_0 I_0 \cos(2\omega t-\phi)$, where the AC component has a ripple corresponding to twice the operational frequency, whereby a current flowing on the DC-link may be obtained by the following Equation 13.

$$i_{DC} = \frac{p_0}{v_{DC}} = \frac{V_0 I_0}{v_{DC}} \cos\phi - \frac{V_0 I_0}{v_{DC}} \cos(2\omega t - \phi) \quad \text{[Equation 13]}$$

It can be learned from Equations 12 and 13 that a ripple corresponding to twice the DC-link operational frequency is generated, and as magnitude of the output voltage and magnitude of output current increase, magnitude of ripple of DC-link power voltage increases. In order to reduce this influence, a capacitance of a DC-link capacitor (128) of unit power cell (120) must be increased, which in turn increases volume and cost of an entire system, whereby reliability of the system is disadvantageously reduced.

Thus, there is a need to address the abovementioned disadvantages.

SUMMARY OF THE DISCLOSURE

This section provides a general summary of the disclosure, and is not a comprehensive disclosure of its full scope or all of its features.

The present disclosure is disclosed to solve the aforementioned problems and disadvantages, and the present disclosure provides a control apparatus for regenerative medium voltage inverter configured to reduce magnitude of ripple at a DC-link power voltage through an active voltage control of a unit power cell of the regenerative medium voltage inverter, whereby capacitance of a DC-link capacitor can be reduced.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a control apparatus for regenerative medium voltage inverter, the apparatus comprising: a converter unit configured to include a plurality of power devices, and convert a three-phase power to a DC voltage; a gate signal generating unit configured to output a PWM signal which is a switching signal of the plurality of power devices; a current controller configured to generate a voltage command from a current command and a measured current and apply the voltage command to the gate signal generating unit; and a generating unit configured to generate a voltage compensating a power difference between an input and an output of the converter unit, and provide the voltage to the current controller.

Preferably, but not necessarily, the apparatus further comprises a voltage controller configured to generate the current command of a synchronous reference frame using the voltage command and a measured voltage.

Preferably, but not necessarily, the apparatus further comprises a phase detecting unit configured to provide phase angle information of an input power; and a first coordinate converting unit configured to convert the input power from a stationary reference frame to the synchronous reference frame and provide the converted input power to the current controller.

Preferably, but not necessarily, the generating unit comprises: a magnitude determining unit configured to determine a magnitude of a compensating voltage using a power difference between the input and the output of the converter unit; first and second phase determining units configured to determine a phase of the compensating voltage; and a second coordinate converting unit configured to convert the magnitude and phase-determined compensating voltage from the stationary reference frame to the synchronous reference frame.

Preferably, but not necessarily, the magnitude determining unit performs a proportional control and determines a magnitude of the compensating voltage according to the magnitude of gain of the proportional control.

Preferably, but not necessarily, the magnitude determining unit divides the power difference between the input and output of the converting unit by a magnitude of a power source-side current to determine a magnitude of the command voltage.

Preferably, but not necessarily, the first phase determining unit determines a phase by using a sine function.

Preferably, but not necessarily, the second phase determining unit determines a phase using a cosine function.

In another general aspect of the present disclosure, there is provided a control apparatus for regenerative medium voltage inverter configured to reduce a ripple of a DC-link voltage of a unit power cell combining outputs of a medium voltage inverter, the apparatus comprising: a power compensation voltage generating unit configured to control a switching of the converter unit by generating a voltage compensating a power difference between an input and an output of the converter unit.

The control apparatus for regenerative medium voltage inverter according to present disclosure has an advantageous effect in that a ripple of a DC-link power voltage can be reduced and a ripple of a DC-link power voltage can be removed to miniaturize a DC-link capacitor by removing a power imbalance at the DC-link capacitor using an additional voltage calculated by a power compensating voltage generating unit.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a control apparatus for regenerative medium voltage inverter according to the present disclosure will be described in detail with reference to the accompanying drawings.

The present disclosure proposes a new power cell control of a regenerative series H-bridge medium voltage inverter which is one of medium voltage inverters. The power cell control proposed by the present disclosure is capable of performing a regenerative operation, power factor control of an input power source-side and a DC-link output voltage control. The medium voltage inverter control according to the present disclosure limits a ripple of a DC-link power source voltage to relatively reduce a capacitance of a DC-link capacity, whereby volume and cost of an entire system can be saved.

Now, exemplary embodiments of the present disclosure will be described in detail with reference to the accompanying drawings.

Figure 6:
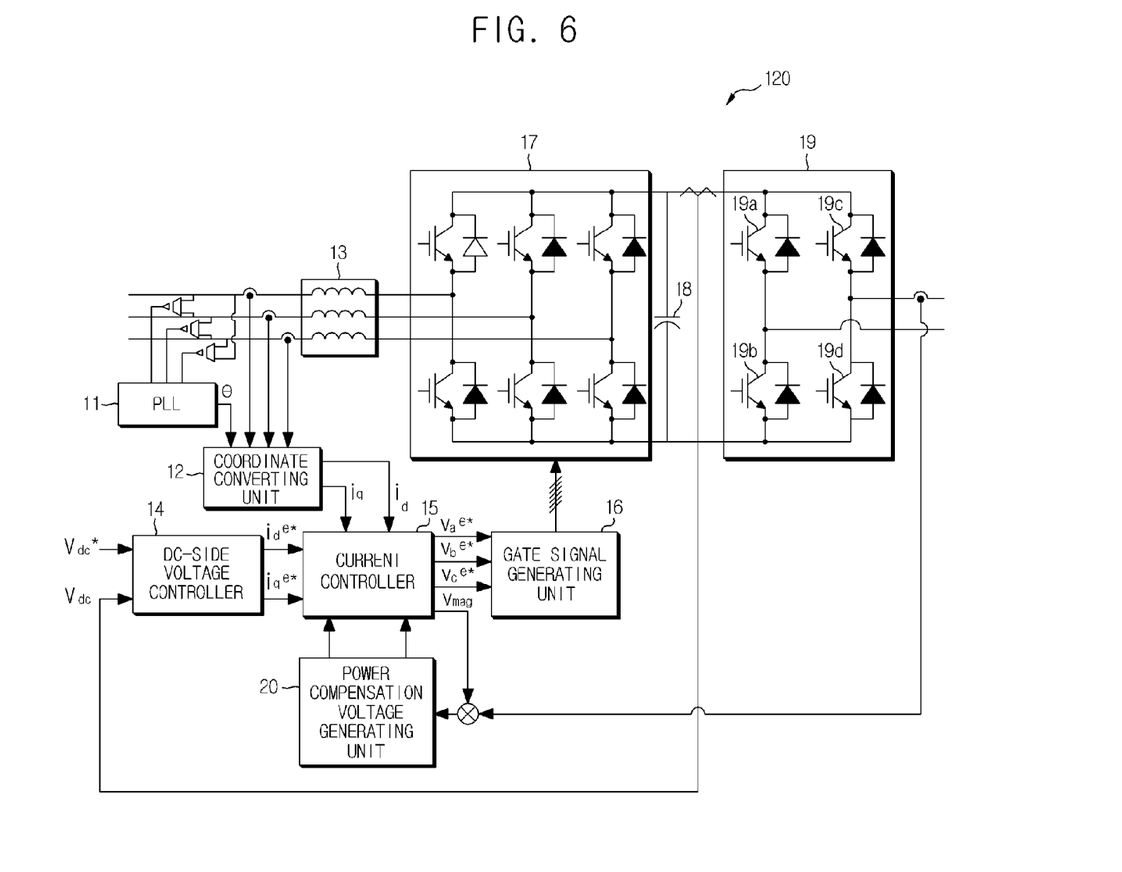
FIG. 6 is a structural view of a unit power cell in a control apparatus for regenerative medium voltage inverter system according to an exemplary embodiment of the present disclosure.

FIG. 6 is a structural view of a unit power cell in a control apparatus for regenerative medium voltage inverter system according to an exemplary embodiment of the present disclosure, where a conventional three-phase booster type PWM converter topology may be applied. Although the unit power cell of FIG. 6 may be applied to the inverter system of FIG. 1, applications to other inverter systems are not ruled out.

Referring to FIG. 1, a regenerative medium voltage inverter (100) according to the present disclosure is an inverter that receives a voltage, whose RMS (root mean square) value is over 600V in line-to-line voltage, from an input power source (200) and supplies a three-phase power to a three-phase motor (300). Preferably, the motor (300) is an induction machine or a synchronous machine but is not limited thereto.

A phase shift transformer (110) serves to provide a galvanic insulation between the input power source (200) and the regenerative medium voltage inverter (100), to reduce harmonics of an input side (terminal), and improve a THD (Total Harmonic Distortion) of a power source current. Furthermore, the phase shift transformer (11) provides a three-phase power source to each power cell (120). The input filter (12) functions to reduce harmonics from the input side.

The unit power cell (120) receives the power from the phase switching transformer (110) and outputs phase voltages to the motor (300). The phase voltages are combined (synthesized) as a sum of voltages of unit power cells of each phase. As exemplified in FIG. 1, 'a' phase output voltage of the medium voltage inverter (100) is a sum of output voltages of serially-connected unit power cells (120a1, 120a2), an output voltage of 'b' phase and that of 'c' phase are respectively 120b1 and 120b2, and a sum of output voltages of 120c1 and 120c2. The combined 'a', 'b', 'c' phase voltages are mutually apart with a 120° phase difference.

However, it should be apparent to the skilled in the art that, although the regenerative medium voltage inverter configured with a 2-level unit power cell is exemplified in FIG. 1, the present disclosure is not limited thereto, and the number of unit power cells may be changed as required, and a plurality of unit power cells can be included in response to an output voltage.

The present disclosure is to generate a voltage command for controlling a PWM converter unit of unit power cell in FIG. 1.

Referring to FIG. 6, the unit power cell (120) according to the control apparatus for regenerative medium voltage inverter comprises a PLL (Phase Locked Loop, 11), a coordinate converting unit (12), an inverter (13), a DC-link voltage controller (14), a current controller (15), a gate signal generating unit (16), a PWM converter unit (17), a DC-link capacitor (18), an inverter unit (19) and a power compensation voltage generating unit (20).

The PLL (11) provides phase angle information of an input power source inputted into the unit power cell (120). The coordinate converting unit (12) converts a current on a three-phase stationary reference frame to a current on a synchronous reference frame. The inverter (13) boosts a DC-link voltage, and improves a THD (Total Harmonic Distortion) of the current.

The DC-link voltage controller (14) generates d-axis and q-axis current commands on the synchronous reference frame, using a DC-link voltage command and a measured DC-link voltage. The current controller (15) generates a voltage command from the current command received from the DC-link voltage controller (14) and measured actual current.

The gate signal generating unit (16) generates a switch signal of each power device at the PWM converter unit (17), and outputs a PWM signal. The PWM converter unit (17), a control object of the present disclosure, converts the applied power source to a DC voltage, using the PWM signal of the gate signal generating unit (16).

The DC-link capacitor (18) is to solve the power imbalance at an input side (terminal) and an output side, and increases the DC-link voltage in a case an input power supplied from power source side is greater than an output power source consumed by a load, and alternatively decreases the DC-link voltage in a reverse case. The inverter unit (19) is preferably a single phase full bridge inverter to generate an output voltage from the DC-link voltage of the DC-link capacitor (18) through power switches (19a-19d).

The power compensation voltage generating unit (20) generates a voltage command to reduce a difference between an input and an output of the PWM converter unit (17), and provides the voltage command to the current controller (15).

Figure 7:
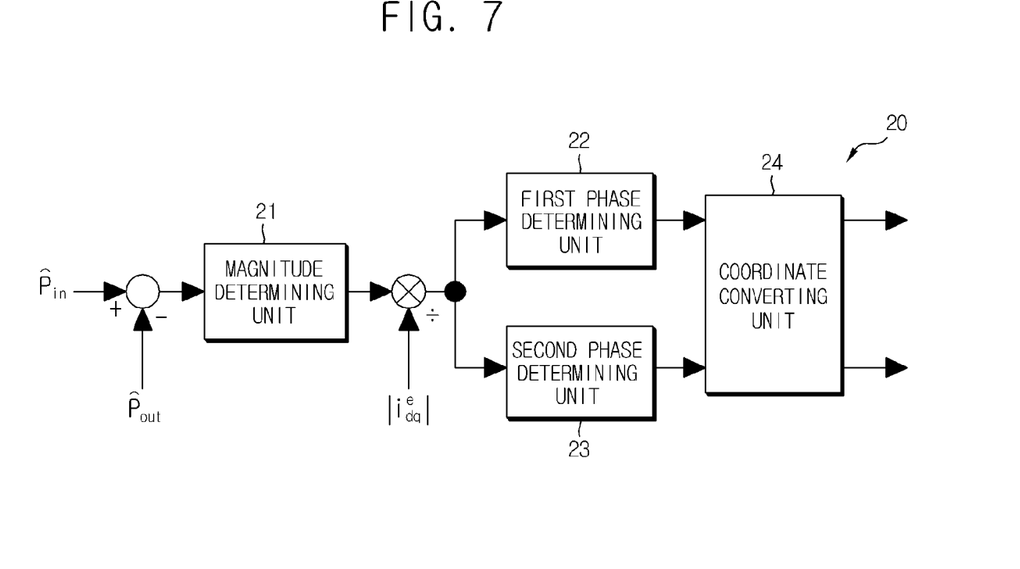
FIG. 7 is a detailed structural view illustrating a power compensating voltage generating unit of FIG. 6 according to an exemplary embodiment of the present disclosure.

FIG. 7 is a detailed structural view illustrating a power compensating voltage generating unit of FIG. 6 according to an exemplary embodiment of the present disclosure.

Referring to FIG. 7, the power compensation voltage generating unit (20) comprises a magnitude determining unit (21), first and second phase determining units (22, 23) and a coordinate converting unit (24).

The magnitude determining unit (21) performs a proportional control for determining a magnitude of a compensation voltage from the difference between an input and an output of the PWM converter unit (17), and divides by the magnitude of the power source-side current to determine the magnitude of the compensation voltage. For a non-limiting example, the magnitude determining unit (21) can perform a proportional control, where the magnitude of the compensation voltage may be determined by the magnitude of proportional gain (k).

The first and second phase determining units (22, 23) determine a phase of the compensation voltage for power compensation. The first phase determining unit (22) uses a sine function and the second phase determining unit (23) uses a cosine function to generate a voltage command for compensation voltage.

The coordinate converting unit (24) converts the voltage command to the compensation voltage determined by the first and second phase determining units (22, 23) from the stationary reference frame to the synchronous reference frame.

Now, operations in FIGS. 6 and 7 will be described. It can be learned that the unit power cell in the present disclosure is a configuration where the power compensation voltage generating unit (20) is added to the configuration of FIG. 2.

The power compensation voltage generating unit (20) controls a ripple of the DC-link power source voltage by adding a voltage for compensating a power difference between an input and an output of the PWM converter unit (17), to the output of the current controller (15). In order to generate the compensation voltage command, the power difference between an input and an output of the PWM converter unit (17) is required, which can be directly obtained by calculating a power of the DC-link capacitor (18), or by calculating a power of an input side of the PWM converter unit (17) and a power of an output side of the inverter unit (19).

The power of the DC-link capacitor (18) may be determined by an equation on capacitor power as in the following Equation 14.

$$p_{cap} = \frac{C}{2} \frac{dv_d^2}{dt} = P_{in} - P_{out} \qquad \text{[Equation 14]}$$

Approximation by disregarding terms of more than two orders in the above Equation 14 using Taylor Series comes to reach the following Equation 15.

$$P_{cap} = Cv_{d0}\frac{dv_d}{dt} \quad \text{[Equation 15]}$$

where, C is a capacitance of the DC-link capacitor (18), $v_d$ is a DC-link voltage, and $v_{d0}$ is an operating point of the DC-link voltage.

An input-side power and an output-side power may be obtained by the following Equations.

$$P_{in} = e_a i_a + e_b i_b + e_c i_c \quad \text{[Equation 16]}$$

$$P_{out} = V_o j_o \quad \text{[Equation 17]}$$

where, $e_a$, $e_b$, $e_c$ and $i_a$, $i_b$, $i_c$ are respectively input-side voltages and currents. A difference between an input and an output may be selectively obtained, depending on system configuration, by calculation of power of the DC-link capacitor (18) or a direction calculation of a power between an input side of the PWM converter unit (17) and an output side of the inverter unit (19). The power thus obtained determines the magnitude of the command voltage by performing, by the magnitude determining unit (21), the PI control, and dividing the magnitude of the power source-side current.

The first and second phase determining units (22, 23) determine phases of the command voltage whose magnitude is determined by the magnitude determining unit. The following Equations 18 and 19 respectively represent phases determined by the first and second phase determining units (22, 23).

$$\sin(\theta_e) = \frac{i_d^s}{\sqrt{i_d^{s2} + i_q^{s2}}} \quad \text{[Equation 18]}$$

$$\cos(\theta_e) = \frac{i_q^s}{\sqrt{i_d^{s2} + i_q^{s2}}} \quad \text{[Equation 19]}$$

The voltage command determined by Equations 17, 18 and 19 is converted to the stationary reference frame by the coordinate converting unit (24) and added to an output voltage of the current controller (15).

Except for the operation of the power compensation voltage generating unit (20), operations of each constituent element are same as those in the unit power cells of FIG. 2, such that no more detailed description is provided herein.

The control apparatus for regenerative medium voltage inverter according to exemplary embodiments of the present disclosure have an industrial applicability in that a power imbalance at a DC-link capacitor can be removed using an additional voltage calculated by a power compensation voltage generating unit (20), whereby capacitance of a DC-link capacitor can be miniaturized.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

The invention claimed is:

1. A control apparatus for regenerative medium voltage inverter, the apparatus comprising;
   a converter unit configured to include a plurality of power devices, and convert a three-phase power to a DC voltage;
   a gate signal generating unit configured to output a PWM signal which is a switching signal of the plurality of power devices;
   current controller configured to generate a voltage command from a current command and a measured current and apply the voltage command to the gate signal generating unit;
   a generating unit configured to generate a voltage compensating a power difference between an input and an output of the converter unit, and provide the voltage to the current controller;
   a phase detecting unit configured to provide phase angle information of an input power; and
   a first coordinate converting unit configured to convert the input power from a stationary reference frame to a synchronous reference frame and provide the converted input power to the current controller.

2. The apparatus of claim 1, further comprising:
   a voltage controller configured to generate the current command of the synchronous reference frame using a DC-link voltage command and a measured DC-link voltage.

3. A controller apparatus for regenerative medium voltage inverter, the apparatus comprising;
   a converter unit configured to include a plurality of power devices, and convert a three-phase power to DC voltage;
   a gate signal generating unit configured to output a PWM signal which is a switching signal of the plurality of power devices;
   a current controller configured to generate a voltage command from a current command and a measured current and apply the voltage command to the gate signal generating unit; and
   a generating unit configured to generate a voltage compensating a power difference between an input and an output of the converter unit, and provide the voltage to the current controller,
   a magnitude determining unit configured to determine a magnitude of a compensating voltage using a power difference between the input and the output of the converter unit;
   first and second phase determining units configured to determine a phase of the compensating voltage; and
   a second coordinate converting unit configured to convert the magnitude and phase-determined compensating voltage from a stationary reference frame to a synchronous reference frame.

4. The apparatus of claim 3, wherein the magnitude determining unit performs a proportional control and determines a magnitude of the compensating voltage according to the magnitude of gain of the proportional control.

5. The apparatus of claim 3, wherein the magnitude determining unit divides the power difference between the input and output of the converting unit by a magnitude of a power source-side current to determine a magnitude of the command voltage.

6. The apparatus of claim 3, wherein the first phase determining unit determines a phase by using a sine function.

7. The apparatus of claim 3, wherein the second phase determining unit determines a phase using a cosine function.

* * * * *